(12) United States Patent
Lutz et al.

(10) Patent No.: US 7,674,183 B2
(45) Date of Patent: Mar. 9, 2010

(54) TELESCOPIC DRIVE JOINT

(75) Inventors: Mathias Lutz, Tübingen (DE); Bernd Patzelt, Magdeburg (DE)

(73) Assignee: Shaft-Form Engineering GmbH, Mülheim (DE)

( * ) Notice: Subject to any disclaimer, the term of this patent is extended or adjusted under 35 U.S.C. 154(b) by 638 days.

(21) Appl. No.: 10/582,559

(22) PCT Filed: Dec. 13, 2004

(86) PCT No.: PCT/EP2004/014192
§ 371 (c)(1),
(2), (4) Date: Aug. 24, 2006

(87) PCT Pub. No.: WO2005/056327
PCT Pub. Date: Jun. 23, 2005

(65) Prior Publication Data
US 2007/0123356 A1 May 31, 2007

(30) Foreign Application Priority Data
Dec. 11, 2003 (DE) .............................. 103 57 858
Dec. 8, 2004 (DE) ...................... 10 2004 059 170

(51) Int. Cl.
*F16D 3/224* (2006.01)

(52) U.S. Cl. ........................................ 464/145; 464/906
(58) Field of Classification Search ................. 464/140, 464/144–146, 183, 906; 29/898, 898.067
See application file for complete search history.

(56) References Cited

U.S. PATENT DOCUMENTS

| 5,542,885 A * | 8/1996 | Krude et al. ................. 464/145 |
| 6,171,196 B1 * | 1/2001 | Welschof ..................... 464/146 |
| 6,241,615 B1 * | 6/2001 | Jacob .......................... 464/145 |
| 6,270,419 B1 * | 8/2001 | Jacob .......................... 464/145 |
| 6,379,255 B1 * | 4/2002 | Cermak et al. .............. 464/183 |
| 2003/0008716 A1 | 1/2003 | Boutin |
| 2003/0171152 A1 * | 9/2003 | Jacob et al. |

FOREIGN PATENT DOCUMENTS

| DE | 196 52 100 C1 | 4/1998 |
| DE | 199 43 880 C1 | 6/2001 |
| DE | 100 32 853 C2 | 1/2002 |
| DE | 102 09 933 A1 | 10/2003 |
| DE | 102 37 172 B3 | 4/2004 |

* cited by examiner

*Primary Examiner*—Greg Binda
(74) *Attorney, Agent, or Firm*—Collard & Roe, P.C.

(57) ABSTRACT

The invention relates to a drive joint for permitting a rotationally and axially fixed connection between a first and second shaft sub-section, the connection allowing a limited angular displacement.

12 Claims, 11 Drawing Sheets

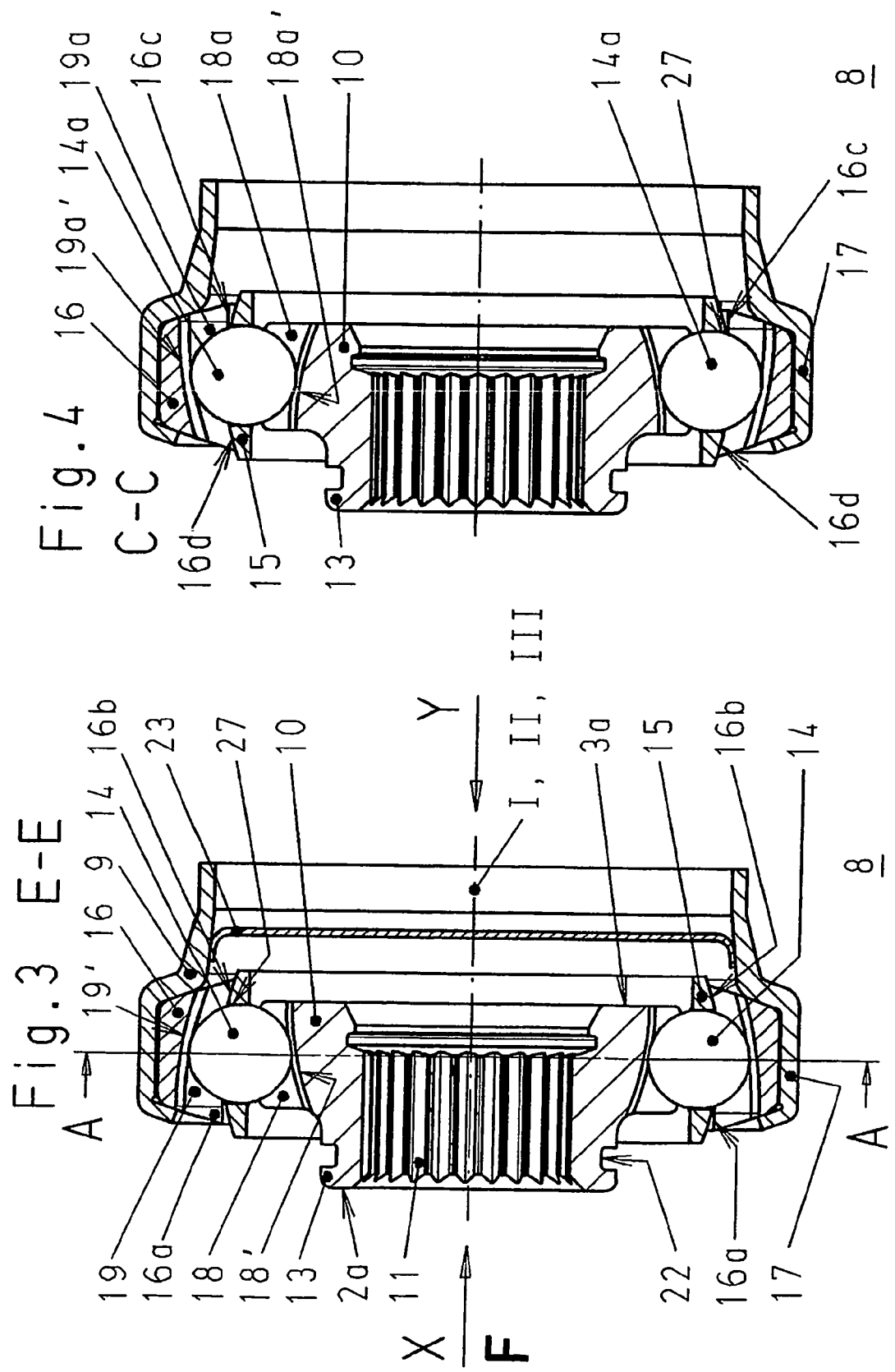

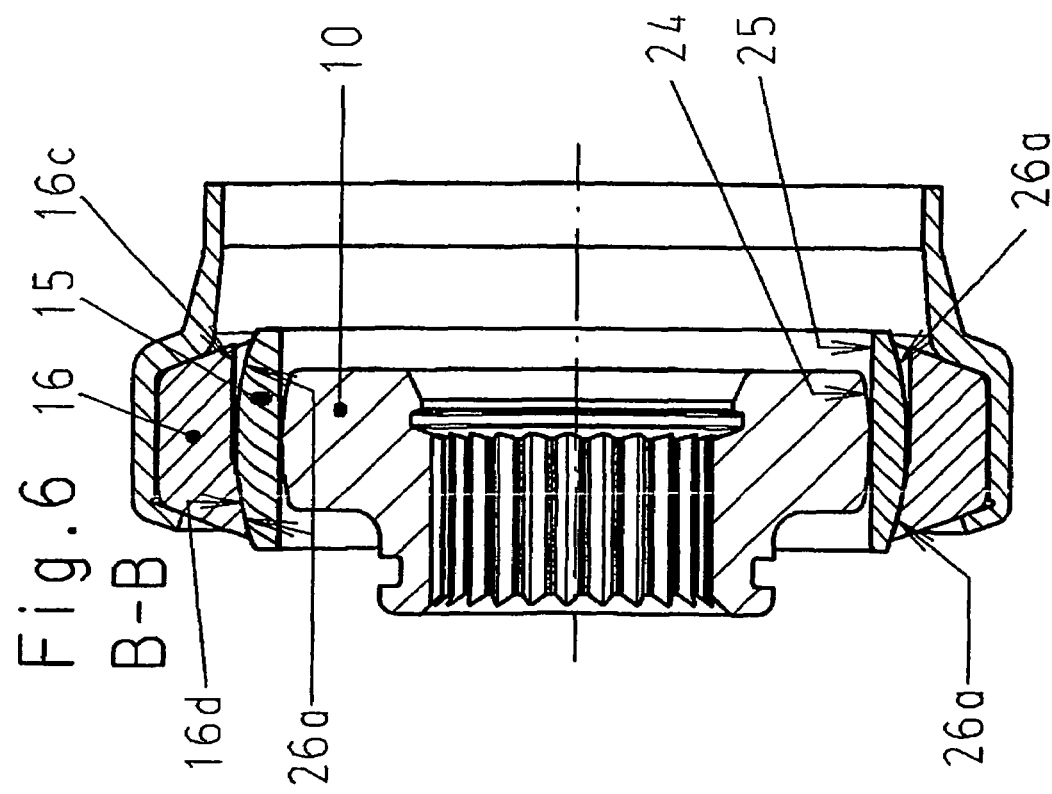
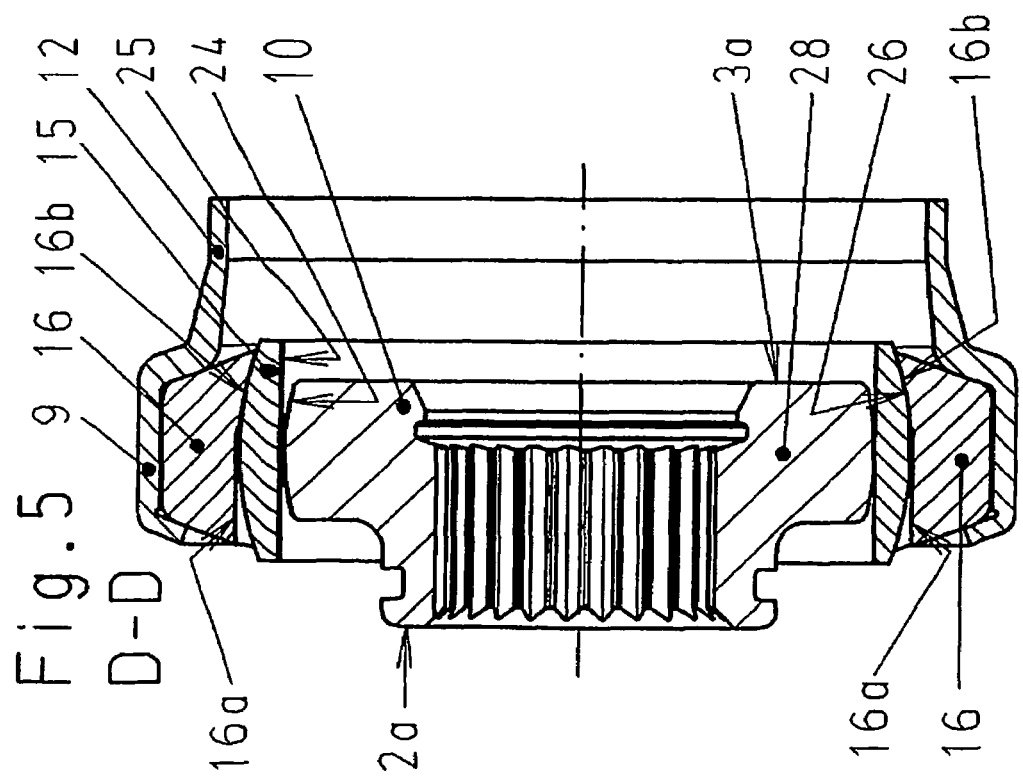

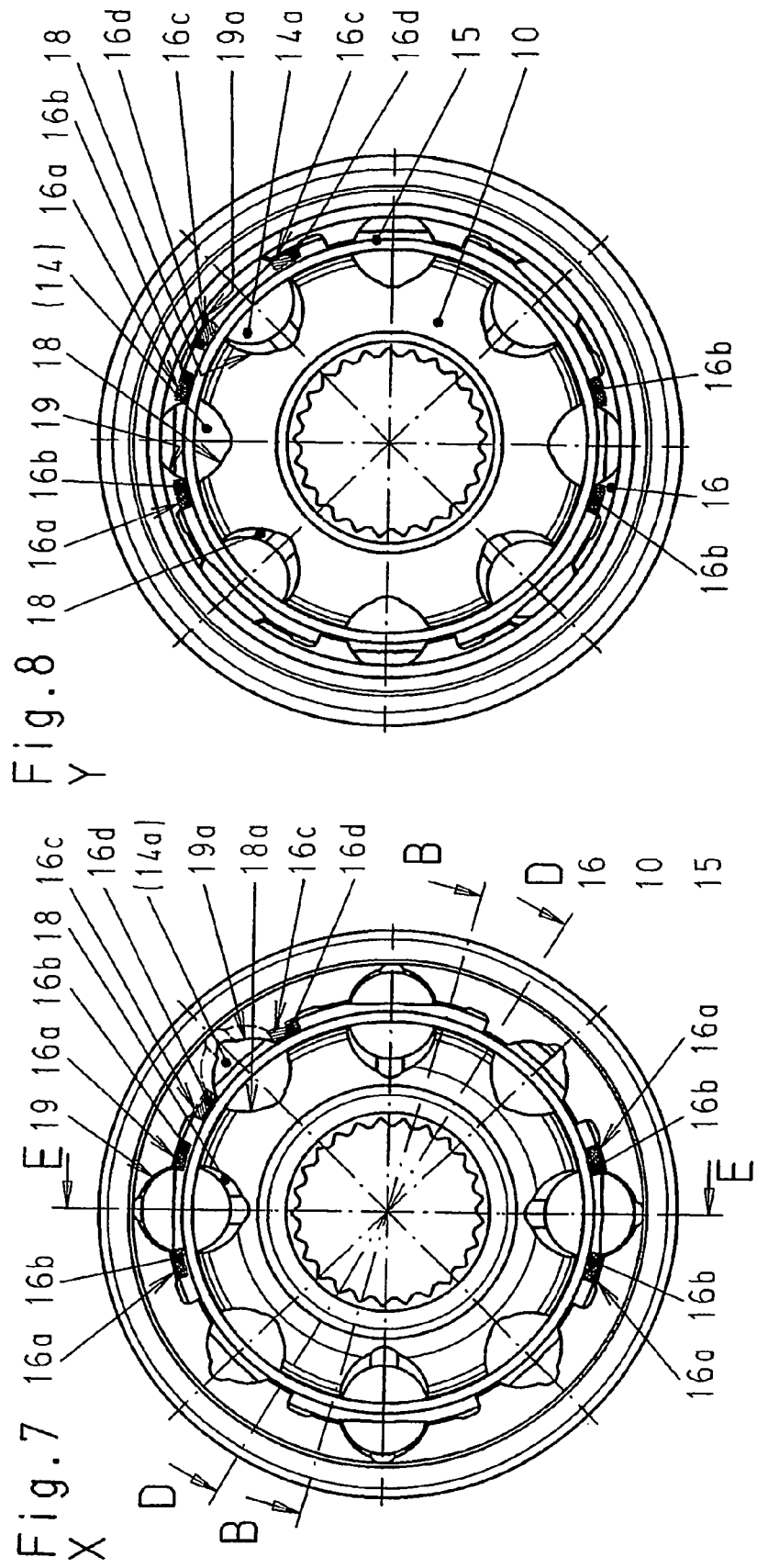

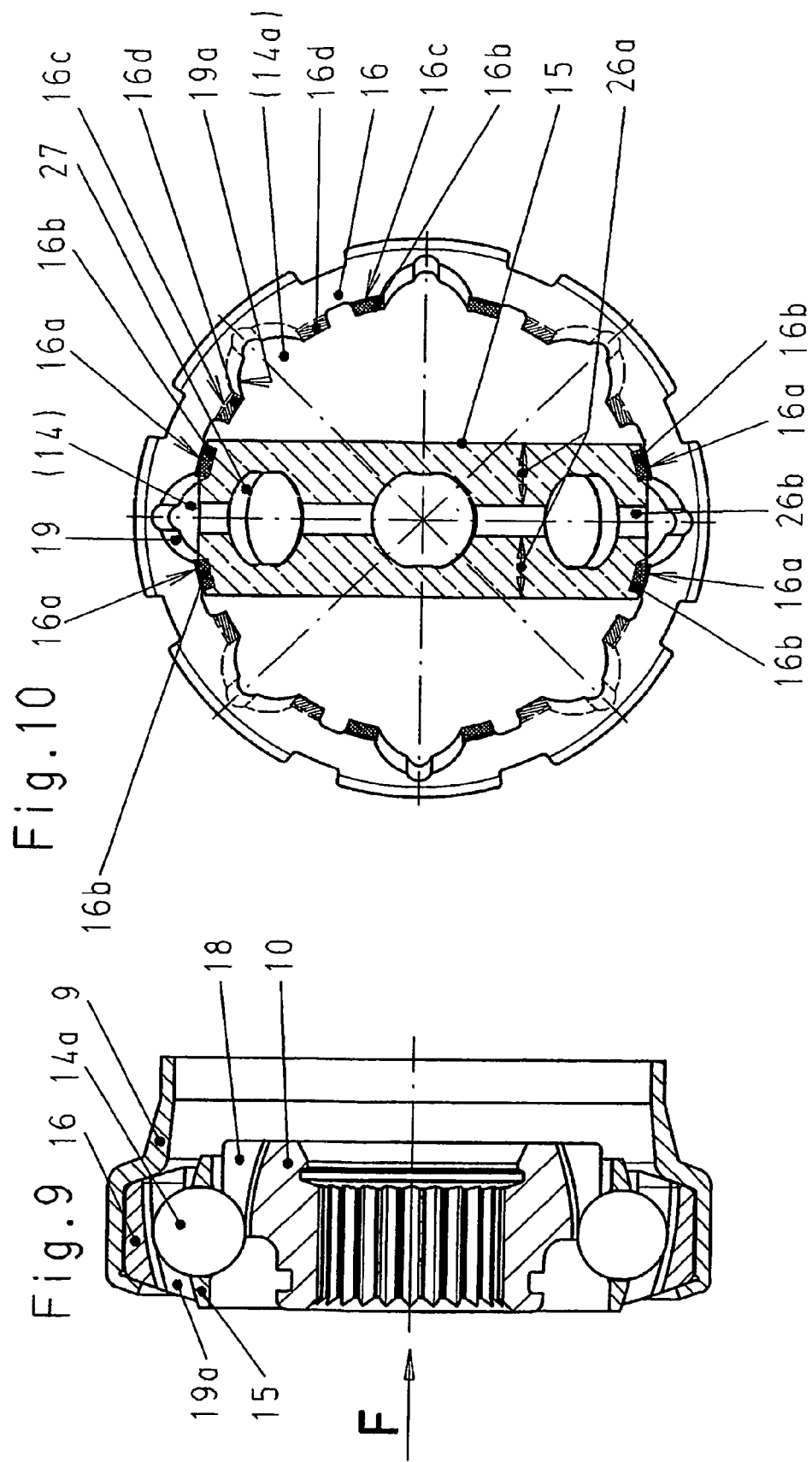

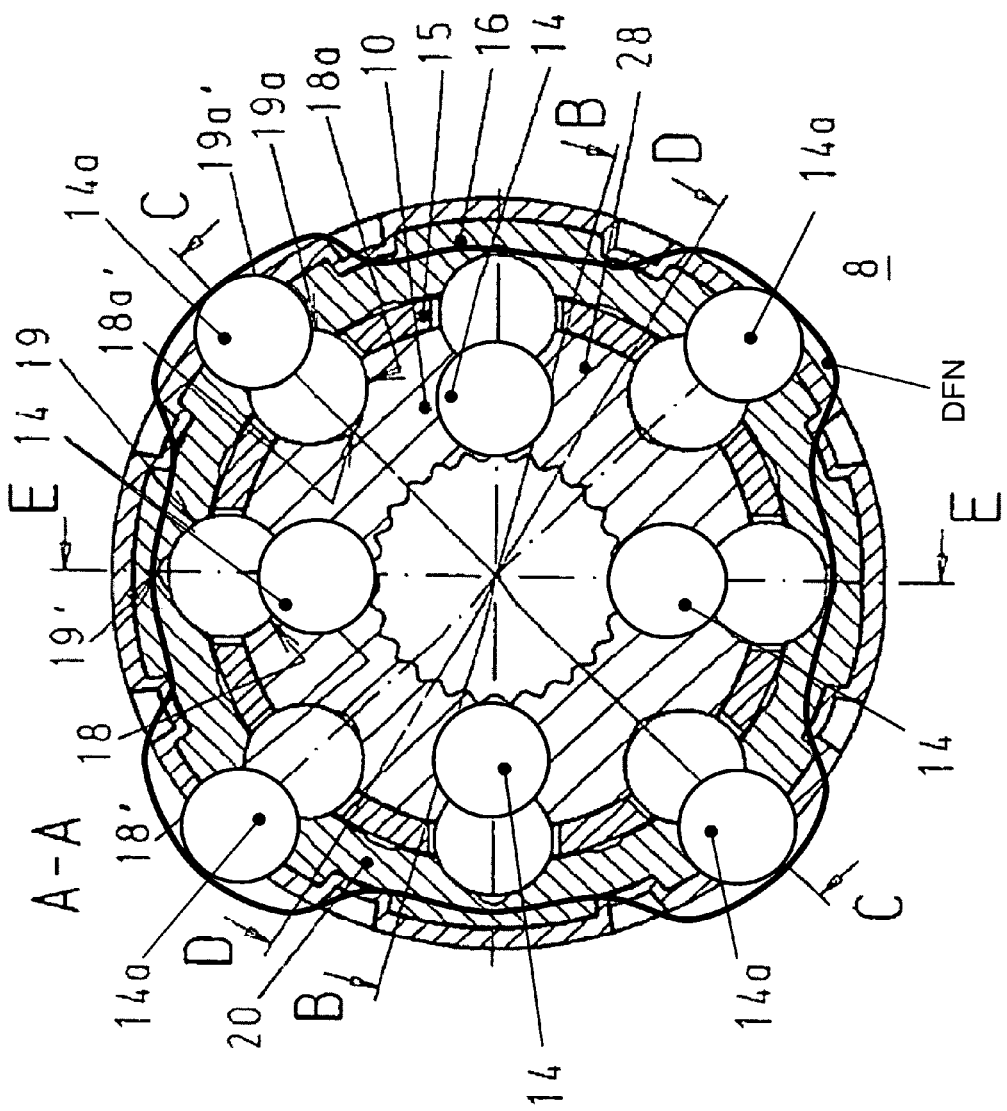

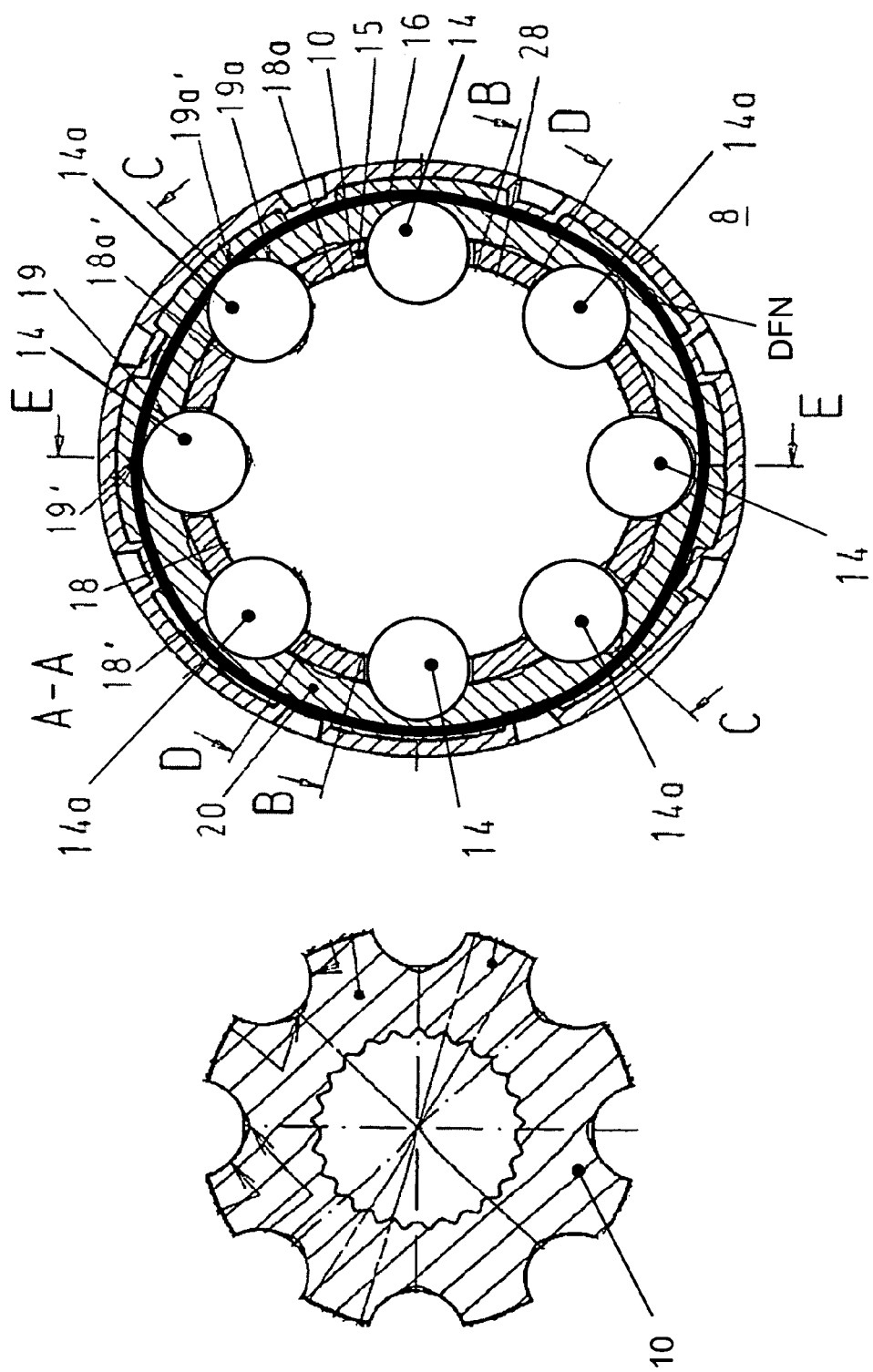

TELESCOPIC DRIVE JOINT

CROSS REFERENCE TO RELATED APPLICATIONS

Applicants claim priority under 35 U.S.C. §119 of German Application No. 103 57 858.7 filed Dec. 11, 2003 and German Application No. 10 2004 059 170.9 filed Dec. 8, 2004. Applicants also claim priority under 35 U.S.C. §365 of PCT/EP2004/014192 filed Dec. 13, 2004. The international application under PCT article 21(2) was not published in English.

The invention relates to a telescoping drive joint for permitting a rotationally and axially fixed connection, nevertheless allowing a limited angular movement, between a first and a second shaft sub-section of a drive shaft, such as a longitudinal shaft for motor vehicles, whereby the drive joint has an inner joint part (inner hub) and an outer joint part (outer hub), as well as torque transfer means provided between them, such as balls, and a means that guides the latter, such as a cage, as additional joint parts.

A drive shaft having two shaft sub-sections is known from DE 199 43 880 C1, which sub-sections are connected with one another by way of a drive joint that is disposed approximately in the center. The cage of this drive joint has a planned breaking point that is designed in such a manner that a high axial force acting on the shaft sub-sections, which can occur during accidents, for example, destroys the cage and therefore the drive joint. In this way, the inner joint part and the opposite shaft sub-section attached to it can penetrate, in telescoping manner, into the outer shaft part and the opposite shaft sub-section connected with the latter. This results in a desirable axial shortening of the drive arrangement, thereby avoiding lateral bending away of the drive arrangement, which could possibly penetrate into the vehicle interior, while rotating, in the bent state.

The telescoping process is initiated, according to DE 199 43 880 C1, by means of bursting of the ball cage, consequent to which the balls and cage fragments penetrate into the shaft sub-section connected with the outer joint part, and thus are supposed to clear the path for an axial displacement of the inner joint part.

Since the axial force that is required for destruction of the cage is generally very great, it cannot be precluded that the shaft bends out, instead of being pushed into itself. Furthermore, it is not precluded that the cage parts become wedged, and thus a displacement movement that proceeds without force, to a great extent, is prevented. Therefore, the result aimed at with this state of the art might possibly not be achieved, and instead there is the risk that the drive shaft bends away in uncontrolled manner, and injures passengers of the vehicle in doing so.

It is therefore the task of the invention to create a telescoping drive joint that guarantees reliable and bend-free telescoping if a predetermined axial force on the drive joint, particularly one resulting from an accident, is exceeded, without the shaft sub-sections becoming wedged in uncontrolled manner due to burst components. Furthermore, the drive joint according to the invention is supposed to be simpler and less expensive to produce, and simpler in assembly.

According to the invention, this is accomplished essentially in that the joint is structured so as to disengage, so that when a certain axial force or energy, particularly resulting from an accident, that acts on the shaft sub-sections, by means of which the distance between the two ends of the drive shaft would be shortened, is exceeded, the joint parts disengage and the one shaft sub-section can go into the other. In this connection, it can be advantageous that destruction-free disengagement similar to the process of opening a push button takes place. Disengagement can take place by means of elastic and/or plastic deformation of individual ones or several of the joint parts.

According to one embodiment of the invention, the outer joint hub forms a deformation element. In this connection, the outer joint hub can be configured in such a manner that when a predetermined axial force on the drive shaft is exceeded, it allows disengagement of the inner hub from the outer hub, with plastic and/or elastic deformation.

The invention can be implemented in particularly simple manner if several raceways assigned to one another are provided in the inner hub and the outer hub, in which balls are accommodated to transfer torque, and that a series of (inner) raceways of the inner hub runs at a slant to the axis of the inner hub, and is configured in such a manner that the raceways of the inner hub can be plastically and/or elastically deformed when the inner hub and the outer hub disengage, by means of the balls, at least at their drive end.

Independent of whether the disengagement takes place by means of plastic and/or elastic deformation, by means of widening the outer hub, or by means of spring-in, or by means of elastic and/or plastic deformation of the inner hub or the like, it can be advantageous if the cage for the balls used as torque transfer means is centered in the outer hub, in that the cage has a spherical outer contour, by way of which it is mounted to pivot in an inner circumference contour of the outer hub that is at least partially formed on. In this connection, it is practical if the contours of the outer cage surface and the centering surfaces of the outer hub are shaped in such a manner, at least in the disengagement direction, and provided with such a strength that the cage is held firmly relative to the outer hub during disengagement, and is not destroyed even when the inner hub disengages.

However, the invention can also be implemented in a joint in which the inner hub is centered in the cage, and inner hub and outer hub are centered relative to one another by way of the balls, particularly, however, also in those as described in DE 100 32 853 C2 and DE 199 43 880 C1.

According to the invention, the inner hub, independent of the configuration of the joint, can have an inner insertion gearing oriented coaxially to the axis of the inner hub, for accommodating an outer insertion gearing, for example of the first shaft sub-section.

Furthermore, it can be practical if the inner hub has a ring groove on its drive-side end, which serves as an assembly aid.

In some application cases it is preferred if the joint has a weld flange for attachment to the second shaft sub-section, for example, on its drive-side and/or power-take-off-side end.

Furthermore, it can be advantageous if a lid is wedged in place between the accommodation region for the outer hub and the weld flange, on the inside of a carrier housing that surrounds the outer hub, which prevents grease from escaping.

The invention furthermore relates to a drive joint that has a drive side and a power take-off side, having
an inner hub that has an inner hub axis and an outer surface, in which first and second inner running grooves (inner raceways) are disposed, distributed alternately about the inner hub axis, whereby the first inner running grooves run proceeding from the drive-side end in the direction of the power-take-off-side end, and their groove root moves away from the inner hub axis as this happens, and whereby the second inner running grooves run proceeding from the power-take-off-side end in the direction of the drive-side end, and their groove root moves away from the inner hub axis as this happens, an outer hub that as an outer hub axis and an inner contour, in which first and second outer running grooves (outer raceways) are disposed, distributed alternately about the outer hub axis, and the first inner running grooves lie opposite first outer running grooves, and the second inner running grooves lie opposite second outer running grooves, in each instance, and form a pair with them, in each instance, whereby the first outer running grooves run proceeding from the drive-side end in the direction of the power-take-off-side end, and their groove root approaches the outer hub axis as this happens, and whereby the second outer running grooves run proceeding from the power-take-off-side end in the direction of the drive-side end, and their groove root approaches the outer hub axis as this happens, a ring-shaped cage having a spherical or ball-shaped outer surface, which is disposed between the inner hub and the outer hub, and has radial windows, in accordance with the number of running groove pairs, in which balls that engage in the running grooves are guided, first introduction contours provided in the inner surface of the outer hub, which are disposed on both sides of the first outer running grooves and make a transition, from the drive-side end, at a diameter that at least approximately corresponds to the outside diameter of the cage, at least approximately after half the axial length of the outer hub, into first cage centering surfaces that run at an incline in the direction of the cage axis, and are configured to be ball-shaped, i.e. spherical, in accordance with the spherically shaped contact surfaces of the cage, second introduction contours provided in the inner surface of the outer hub, which are disposed on both sides of the second outer running grooves and make a transition, from the power-take-off-side end, at a diameter that at least approximately corresponds to the outside diameter of the cage, at least approximately after half the axial length of the outer hub, into second cage centering surfaces that run at an incline in the direction of the cage axis, and are configured to be ball-shaped, in accordance with the spherically shaped contact surfaces of the cage, whereby centering of the cage takes place exclusively in the outer hub, and centering of the inner hub relative to the outer hub takes place exclusively by way of the balls.

In the sense of the present invention, balls disposed in the first or second ball raceway pairs are also referred to as balls of the first or second series or row. Preferably, the balls disposed in the various pairs of ball raceways or running grooves do not differ, but rather have the same size and material composition. In some application cases, however, it can be advantageous if the balls accommodated in the first pairs of ball raceways differ from the balls accommodated in the second pairs of ball raceways.

Particularly in the case of the embodiment of a joint described above, it can be advantageous if at least the contour of the second inner running grooves, for example, and/or the contour of the first cage centering surfaces of the outer hub, for example, and/or the contour of the spherical outer surface of the cage, and/or the elasticity of the outer hub, are coordinated with one another in such a way that radial widening is made possible at least in the region of the second outer running grooves, by way of the balls of the second row that are displaced radially outward.

Additional characteristics, advantages, and possibilities of use of the present invention are evident from the following description of exemplary embodiments and on the basis of the drawing. In this connection, all of the characteristics that are described and/or shown in the drawing belong to the object of the present invention, also independent of how they are summarized in the claims or their antecedents. The drawing shows:

FIG. 1 a drive arrangement for a motor vehicle, having two shaft sub-sections and a drive joint disposed approximately in the center, FIG. 2 a section through a drive joint along the line A-A of FIG. 3, FIG. 3 a section along the line E-E of FIG. 2, FIG. 4 a section along the line C-C of FIG. 2, FIG. 5 a section along the line D-D of FIG. 2, FIG. 6 a section along the line B-B of FIG. 2, FIG. 7 a view from the direction of the arrow X of FIG. 3, FIG. 8 a view from the direction of the arrow Y of FIG. 3, FIG. 9 a drive joint according to the invention, in an almost disengaged position, and FIG. 9*a* shows a view of the drive joint of FIG. 2 along line C-C of FIG. 2.

FIG. 9*b* shows a view of the drive joint of FIG. 2 along line E-E of FIG. 2.

FIG. 10 an outer hub of a drive joint according to the invention, with the cage introduced crosswise.

FIG. 13 shows a similar view of a drive joint as shown in FIGS. 11 and 12 but shows the drive joint under high axial force when the outer hub is experiencing plastic or elastic deformation, with the deformation of the outer hub illustrated by the deformation of deformation ring DFN.

FIG. 14 shows a drive joint with a disengaged inner hub or inner joint part and an outer hub or outer joint part.

Figure 1:
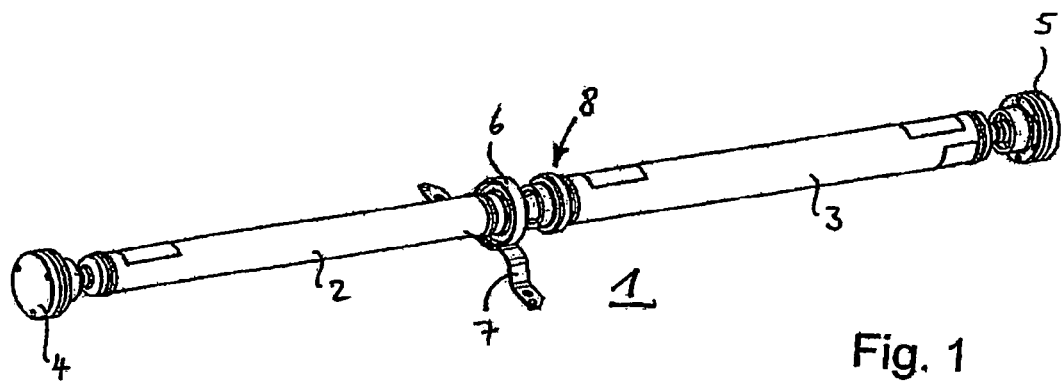
Figure 2:
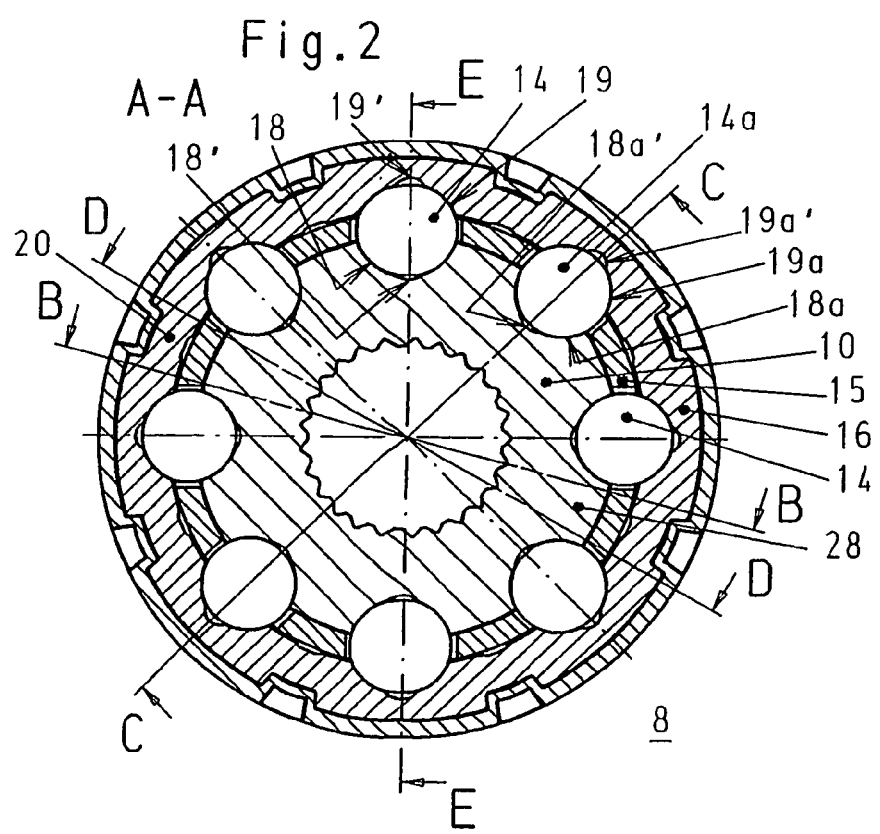

The drive shaft 1 shown in FIG. 1 is configured as a longitudinal drive shaft of a motor vehicle, and comprises two shaft sub-sections 2 and 3, which carry connector pieces 4, 5 at their free ends. Here, these connector pieces are configured as rubber joint disks, although drive joints can also be attached to the shaft sub-sections 2 and 3 in their place, as is the case in the state of the art mentioned initially, or as described in DE 102 37 172 B3 or in DE 100 32 853 C2.

The two shaft sub-sections 2 and 3 are connected with one another approximately in the middle of the drive arrangement 1, by way of a drive joint 8, which is shown in various sectional representations in FIGS. 2 to 9. Furthermore, FIG. 1 shows that the left shaft sub-section 2 can be attached to the floor of a motor vehicle by way of an intermediate bearing 6 and a holder 7 disposed on the latter.

In order for such a drive arrangement not to bend away laterally in the case of a vehicle accident, with an axial force that acts on it, penetrate the vehicle floor, and penetrate into the vehicle interior, the center drive joint 8 is configured so as to disengage, according to the invention.

As is particularly evident from the sectional view according to FIGS. 2 to 6 and 9, which show the drive joint 8 not connected with the shaft sub-sections 2 and 3, the drive shaft consists of an outer hub 16, essentially in the shape of a hollow cylinder, in which an inner hub 10 is coaxially disposed in the position shown. The inner hub 10 and the outer hub 16 can, however, be pivoted relative to one another. While the first shaft sub-section 2 can be inserted into an inner insertion gearing 11 of the inner hub 10 with its outer insertion gearing, the connection between the outer hub and the second shaft sub-section 3, in the case of the embodiment shown, occurs by means of a weld connection. For this purpose, a carrier housing 9 provided with a weld flange 12 is provided, in which the outer hub 16 is accommodated with a positive lock, in an accommodation region 17. A lid 23 shown in FIG. 3 may be wedged in between accommodation region 17 and weld flange 12 on the inside of carrier housing 9.

On the inside of the outer hub 16, first outer ball raceways 19 (first outer running grooves) for a first row of balls 14 are provided. Furthermore, second outer ball raceways 19a (second outer running grooves) are formed in the outer hub, for a second row of balls 14a, whereby ridges 20 are provided between the first and second ball raceways.

On the outside of the inner hub 10, first inner ball raceways 18 (first inner running grooves) for a first row of balls 14 and second inner ball raceways 18a (second inner running grooves) for the second row of balls 14a are provided, whereby ridges 28 are also provided between the first and second ball raceways.

The groove root of the ball raceways 18, 18a, 19, and 19a is indicated with the reference symbols 18', 19', 18a' and 19a', respectively. The drive-side end of the drive joint 8 is indicated with 2a in the figures, as an example, while the power-take-off-side end is indicated with the reference symbol 3a. In the case of this invention, the designations drive-side and power take-off side are used only to differentiate the two ends of the drive joint 8. Of course the drive-side end 2a and the power-take-off-side end 3a can be connected either with a drive shaft or a power take-off shaft.

The inner hub 10 has an inner hub axis I and an outer surface 24. As is particularly evident from FIGS. 3, 7, 8, the first inner running grooves 18 and the second inner running grooves 18a are disposed distributed alternately about the inner hub axis I, whereby the first inner running grooves 18 run proceeding from the drive-side end 2a in the direction of the power-take-off-side end 3a, and the inner running grooves and their groove root 18' move away from the inner hub axis I as this happens; as is particularly evident from FIGS. 4, 7, and 8, the second inner running grooves 18a run proceeding from the power-take-off-side end 3a in the direction of the drive-side end 2a, whereby these second inner running grooves and their groove root 18a' move away from the inner hub axis I as this happens.

The outer hub 16 possesses an outer hub axis II and an inner contour in which the first outer running grooves, i.e. raceways 19 for the first row of balls 14 and the second outer running grooves, i.e. raceways 19a for the second row of balls 14a are disposed distributed alternately about the outer hub axis II. In this connection, the first inner running grooves 18 lie opposite the first outer running grooves 19, in each instance, and the second inner running grooves 18a lie opposite the second outer running grooves 19a, in each instance, and form a pair with them, in each instance. In this connection, the first outer running grooves 19 run proceeding from the drive-side end 2a in the direction of the power-take-off-side end 3a, and their groove root 19' approaches the outer hub axis II as this happens. Accordingly, the second outer running grooves 19a run proceeding from the power-take-off-side end 3a in the direction of the drive-side end 2a, whereby the second running grooves 19a approach the outer hub axis II with their groove root 19a' as this happens, as shown in FIGS. 3 and 4.

In a ring-shaped cage 15 having an outer surface 26 that is spherical at least in certain sections, which cage is disposed between the inner hub 10 and the outer hub 16, radial windows 27 are provided in accordance with the number of balls 14, 14a and the pairs of running grooves 18 and 19, and 18a and 19a, respectively, in which windows the balls 14, 14a are guided. The cage 15 is guided and centered in the outer hub 16 by way of its outer surface 26. For this purpose, the ring-shaped cage 15 has two centering regions 26a on its outer surface 26.

As explained above, ridges 20 are provided in the inner surface of the outer hub 16 between the outer running grooves for the balls. These ridges, as shown in FIGS. 3, 5, 7, 8, and 10, have introduction contours 16a provided on both sides of the outer running grooves 19, for axial introduction of the cage 15 into the outer hub 16. The introduction contours 16a run proceeding from the drive-side end 2a, at a diameter that at least approximately corresponds to the outside diameter of the cage 15, and make a transition at least approximately after half the axial length of the outer hub, into first cage centering surfaces 16b that run at an incline in the direction of the cage axis III. In this connection, the first cage centering surfaces 16b are adapted to be ball-shaped, in accordance with the spherically shaped centering regions 26a of the cage 15.

As shown in FIG. 10, the cage 15 can take place without balls and without inner hub, in the direction of the arrow X, by way of the introduction contours 16a disposed on both sides of first outer running grooves 19 that lie diametrically opposite one another, in each instance, whereby the plane of rotation of the cage is brought into a position at a right angle to the plane of rotation of the outer hub, i.e. the outer hub axis II and the cage axis III stand perpendicular to one another, until the cage 15 makes contact with the first cage centering surfaces 16b with its centering regions 26a. Afterwards, the cage can be pivoted for assembly of the balls and the inner hub, as this is described in greater detail below. Inner hub 10 may have a ring groove 22 shown in FIG. 3 on its drive-side end as an assembly aid.

In the following, assembly of an opposed path joint will be explained. First, the cage is inserted into the outer hub. For this purpose, the cage is pivoted in such a manner that its axis stands essentially perpendicular to the outer hub axis. The cage has a spherical outer surface, i.e. the cage corresponds to a disk cut out of a sphere, having a cylindrical passage.

The cage centering surfaces, respectively, have a contour, at least in their region that comes close to the outer hub axis, between the center of the outer hub and one end, which is configured like a segment of an arc. In this connection, the outside diameter of the cage is less than or equal to the inside diameter in the center of the outer hub.

Therefore the cage can be introduced into the outer hub, guided by cage centering surfaces that lie opposite one another, in its alignment relative to the outer hub, until the cage makes contact with the region of the cage centering surfaces, which comes so close to the outer hub axis that the inside diameter of the outer hub in this region is less than the outside diameter of the cage. In this position, the axes defined by the outside diameter of the cage and the inside diameter in the center of the outer hub lie on top of one another, covering one another.

In this position, the cage can be pivoted into the outer hub, until the axis of the cage and the outer hub axis lie on top of one another, covering one another. The cage 5 can be freely rotated or pivoted in the outer hub, whereby it is guided in the outer hub by the cage centering surfaces. By means of the region of the cage centering surfaces that come close to the outer hub axis, it is furthermore prevented that the cage can be moved in the axial direction, relative to the outer hub, as long as the axis of the cage is not pivoted too far towards the outer hub axis.

It is evident that insertion of the cage into the outer hub in the manner as described above can only take place if two first outer grooves having first cage centering surfaces, or outer grooves having second cage centering surfaces, respectively, lie diametrically opposite one another in the outer hub. This is only achieved, in the case of outer grooves that are uniformly distributed over the circumference, if the number of outer grooves is a whole-number multiple of four.

When the cage has been inserted into the outer hub, and the axis of the cage is aligned to cover the outer hub axis, the inner hub can be inserted into the cage. The inner contour of the cage is cylindrical, and has an inside diameter that is greater than or equal to the greatest outside diameter of the inner hub. The inner hub can therefore be inserted into the cage. In this connection, the inner hub is aligned in such a manner, relative to the outer hub, that first inner grooves lie opposite first outer grooves, and second inner grooves lie opposite second outer grooves 19, and form groove pairs.

In accordance with the number of groove pairs, radial openings are arranged in the cage. In order to insert the balls into the openings of the cage, the cage, with the inner hub, is pivoted relative to the outer hub on the side of the outer grooves on which the track base, respectively, of the outer grooves, respectively, has its greatest distance from the outer hub axis. In other words, an opening of the cage is pivoted out of the outer hub, in each instance, until it comes out of the latter, on the side of the largest opening of the groove pairs, respectively. A ball can now be inserted into the opening of the cage that has been pivoted out in this manner. This procedure must be carried out individually for each ball, i.e. for each groove pair, respectively.

As shown in FIGS. 4, 6, 7, 8, and 10, the outer hub and its ridges, respectively, are configured, in the embodiment shown, in such a manner that additional introduction contours 16c are provided on both sides of the second outer running grooves 19a, in order to be able to introduce the cage 15 also from the power-take-off-side end 3a, in other words in the direction of the arrow Y. For this purpose, the introduction contours 16c also run on the power take-off side 3a with a diameter that at least approximately corresponds to the outside diameter of the cage 15, and make a transition into the second cage centering surfaces 16d on the outer hub, for the cage, after at least approximately half the axial length of the cage. From there, they run at an incline in the direction of the cage axis III. In this connection, the second cage centering surfaces 16d, just like the first cage centering surfaces, are adapted to be ball-shaped, in accordance with the spherically shaped centering regions 26a of the cage 15.

In FIGS. 7, 8, and 10, the cage centering surfaces 16b, which are actually visible to the observer in a top view, but are situated on the side of the outer hub facing away from the observer, are shown with double hatching. The single-hatched cage centering surfaces 16d are not visible to the observer, although they face the observer.

It is practical if at least one circumference contour configured as a flattened region 26b is made between the two contract surfaces, i.e. centering regions 26a of the cage 15, in the case of the embodiment according to FIG. 10, which region can function, in particularly advantageous manner, as a lubricant groove.

Introduction of the cage 15 can also take place in the direction of the arrow Y, by way of the introduction contours 16c disposed on both side of two second outer running grooves 19a that lie diametrically opposite one another, in each instance, whereby the plane of rotation of the cage is brought into a position offset by 45° crosswise to the plane of rotation of the outer hub, as shown in FIG. 10, i.e. the outer hub axis II and the cage axis III stand perpendicular to one another.

The symmetrical configuration of the outer hub as described above makes it possible, in particularly advantageous manner, to produce the outer hub as a part that is shaped without cutting. The contours of the tool that form the cage guidance surfaces, and, in the axial direction, the introduction contours, penetrating from both sides into the outer hub, can thus be pulled out of the outer hub. Because of the configuration of the outer hub, without any undercut, it is possible, for the first time, to produce it without cutting.

Figure 9A:
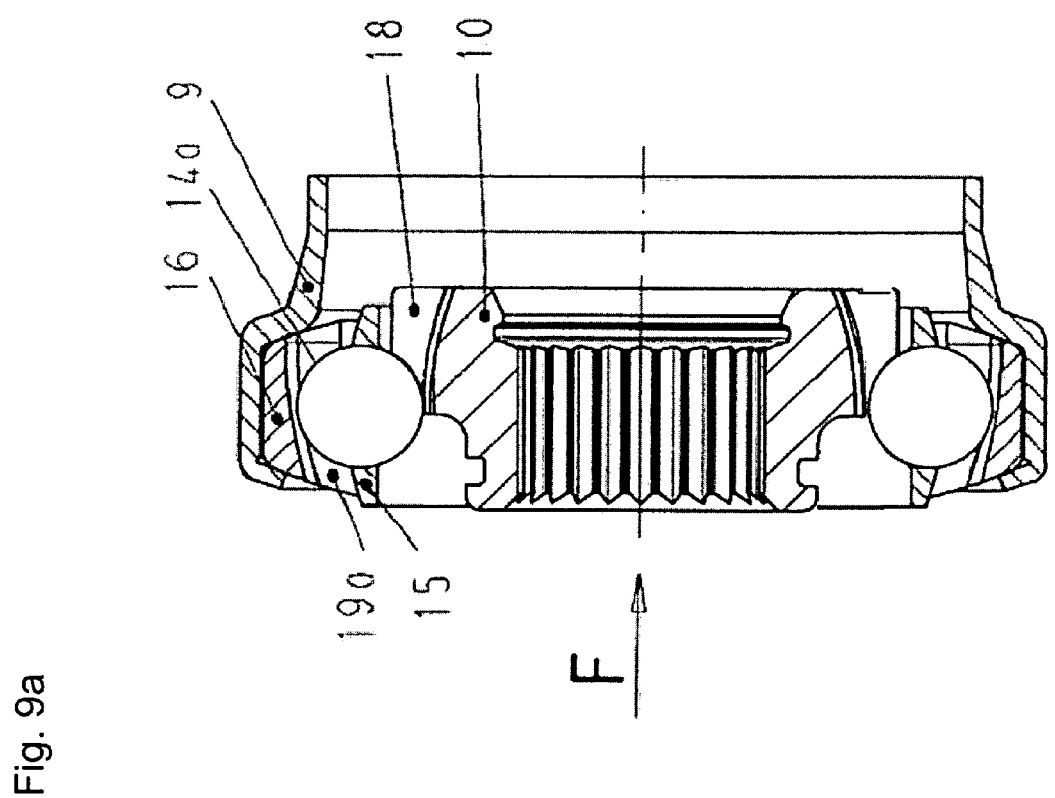
Figure 9B:
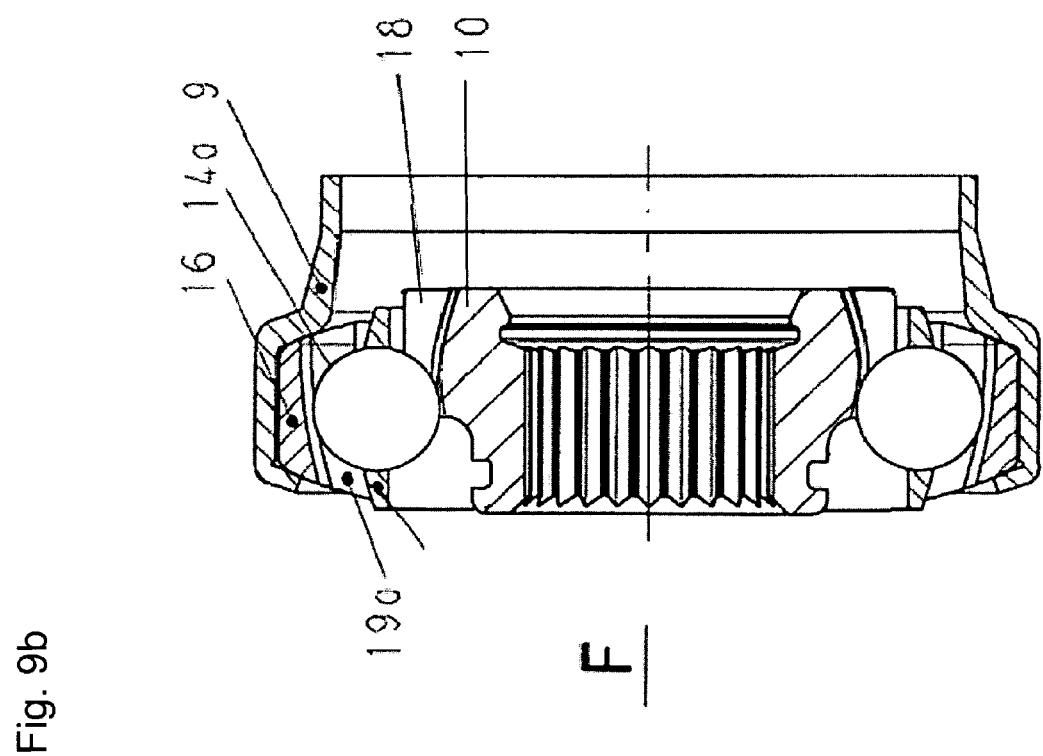
Figure 11:
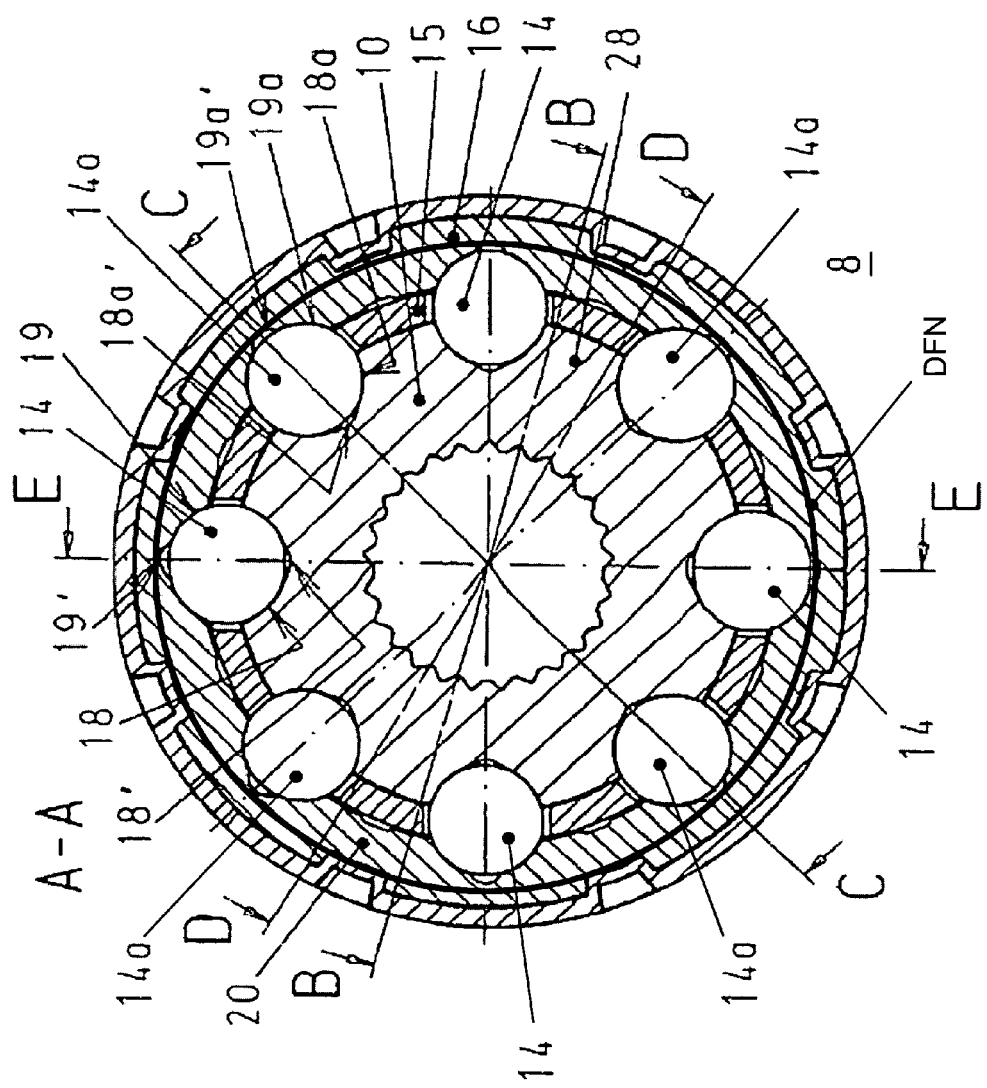
FIG. 11 shows a similar view of a drive joint as shown in FIG. 2, and includes a deformation ring for illustrating the deformation of the outer hub.
Figure 12:
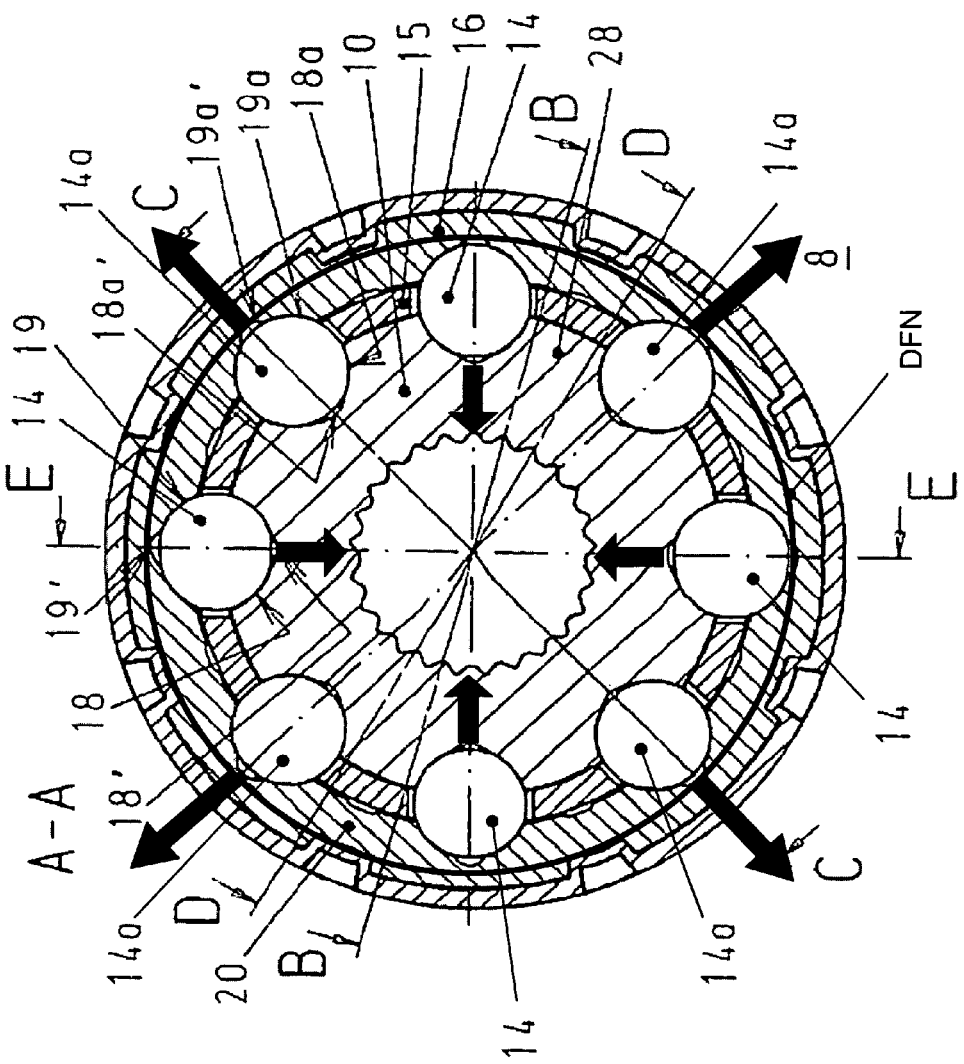
FIG. 12 shows a similar view of a drive joint as shown in FIG. 11 and also shows the direction of force of the inner hub and outer hub pushing against each other via balls.

In order to now avoid having the drive shaft 1 bend out in the region of the joint 8, if high axial forces occur from one shaft sub-section 2 on the other shaft sub-section 3, in the direction of the arrow F, and possibly having it penetrate into the passenger interior, while rotating, something that can occur, in particular, in the case of frontal collisions or rear-end collisions, the joint 8 is configured so as to disengage. For this purpose, in the case of the exemplary embodiment shown, the outer joint ring, i.e. the outer hub, and/or the carrier housing, as shown in FIGS. 4, 9, 9a, 9b, and 11-14, is configured to be elastically deformable. If a high axial force on the shaft sub-sections 2 and 3 now occurs, so that the distance between the connector pieces 4 and 5 is shortened by means of this force, the inner joint part, i.e. the inner hub 10, can be axially displaced relative to the outer joint part, i.e. the outer hub 16. In this connection, the balls 14a of the second raceway pairs are pressed slightly outward radially in the direction shown in FIG. 12, by means of the axial displacement of the second inner ball raceways 18a with the inner joint part, so that the outer hub widens, at least locally, as shown in FIG. 13 by the local widening of deformation ring DEN, and also as shown in FIG. 9a in which the outer hub experiences slight deformation, as exhibited by the outer diameter of the outer hub shown in FIG. 9a that is slightly larger than the outer diameter of the outer hub shown in FIG. 4. In this connection, in the position shown in FIG. 9, the balls 14 in the first raceway pairs are released radially inward in the direction shown in FIG. 12, as is evident in FIG. 3, specifically by a greater amount than the amount that results from the radial migration of the balls 14a. FIG. 9b shows the effect on the inner hub's raceways as the inner running groove root experiences a slight plastic or elastic deformation, seen by the slight inward curvature of the inner running groove 18 and the inner running groove root. In this connection, the disengagement is also facilitated in that the outer hub briefly assumes an almost polygon shape, as shown in FIG. 13 with the deformation ring DEN, in the position of the inner hub corresponding to FIG. 9, which is determined by the corresponding position of the four balls 14a. In the case of a further axial displacement of the inner hub into the outer hub as compared with the position shown in FIG. 9, the balls 14a jump from the inner ball raceways 18a radially inward. As a result, the joint is disengaged (with a complete disengagement shown in FIG. 14), so that the inner hub 10 along with the shaft sub-section 2 can move axially further into the shaft sub-section 3. This telescoping of the shaft sub-section 2 into the shaft sub-section 3 can either take place without hindrance, or, and this can be particularly advantageous, can be damped in defined manner, in that an axial damping device is provided in the shaft sub-section 3, which device can also be configured to have a progressive effect.

Elasticity of the outer hub is also understood to mean the elasticity of the components that surround the outer hub directly, i.e. components that are impaired during the deformation, such as, for example, the accommodation region 17 of the carrier housing 3. Of course, the outer hub 16 can also be configured in one piece with the carrier housing 9, within the scope of the invention.

During disengagement of the drive joint as the result of axial displacement of the inner hub relative to the outer hub, the ball-shaped centering region (bearing surface) 26a of the cage 15 that faces the power-take-off-side end 3a rests on the cage centering surfaces 16b, so that the cage 15 and the balls 14a held by it remain in the original position, also in the position shown in FIG. 9, until the second ball raceways 18a no longer position the balls 14a radially, in the case of a further axial displacement. It is practical if the cage 15 is structured to be so stable that it survives the situation described above without being destroyed.

According to the invention, the inner hub 10 can be configured elastically, alternatively or in addition to the elastic widening of the outer hub as described above, in such a manner that the balls 14a are released by means of a deformation of the inner hub, at least in the region of the second ball raceways 18a, and thus the drive joint disengages. This can take place, for example, by means of making recesses that run in the axis direction, in a region in the inner hub that lies radially within the balls, at least from the drive side, and/or in a region in the outer hub that lies radially outside the balls, at least in the region of the power take-off side.

The invention claimed is:

1. Drive joint for a motor vehicle, which can be connected with a first shaft sub-section and a second shaft sub-section, whereby the drive joint has an outer joint part and an inner joint part disposed axially within the former, in which ball raceways are formed on the inside of the outer joint part and on the outside of the inner joint part, and in which balls are disposed in the ball raceways and spaced apart from one another by means of a ball cage, wherein the joint is designed such that when a certain axial force in the direction of one shaft sub-section towards the other shaft sub-section is exceeded, the joint parts disengage, wherein ridges that point radially inward are formed between the ball raceways of the outer joint part, which are shaped and dimensioned in such a manner that the ball cage remains geometrically and mechanically intact, to a great extent, after disengagement of the joint parts, if an axial force that leads to the inner joint part and the outer joint part being pushed into one another is exceeded.

2. A drive joint for permitting a rotationally and axially fixed connection between a first and a second shaft sub-section of a drive shaft, said connection allowing a limited angular displacement, said drive joint comprising:
(a) an inner hub as an inner joint part, said inner hub having an inner hub axis and an outer contour, in which first inner running grooves and second inner running grooves are disposed, distributed alternately about said inner hub axis, whereby said first inner running grooves run proceeding from the direction of said first shaft sub-section in the direction of said second shaft sub-section, and their groove root moves away from said inner hub axis as this happens, and whereby said second inner running grooves run proceeding from the direction of said second shaft sub-section in the direction of said first shaft sub-section, and their groove root moves away from said inner hub axis as this happens;
(b) an outer hub as an outer joint part, said outer hub having an outer hub axis and an inner contour, in which first outer running grooves and second outer running grooves are disposed, distributed alternately about the outer hub axis, wherein said first inner running grooves lie opposite said first outer running grooves and form first raceway pairs, and said second inner running grooves lie opposite said second outer running grooves and form second raceways pairs, in each instance, whereby said first outer running grooves run proceeding from the direction of said first shaft sub-section in the direction of said second shaft sub-section, and their groove root approaches said outer hub axis as this happens, and whereby said second shaft sub-section run proceeding from the direction of said second shaft sub-section in the direction of said first shaft sub-section, and their groove root approaches said outer hub axis as this happens, wherein said inner hub and/or said outer hub is configured as a deformation element; and
(c) a torque transfer mechanism between said inner hub and said outer hub as additional joint parts, said torque transfer mechanism having balls for transferring torque; wherein when a certain axial force in the direction of one shaft sub-section towards the other shaft sub-section is exceeded, said inner hub is axially displaced relative to said outer hub, balls of said second raceway pairs are pressed outward radially, so that said inner hub and/or said outer hub is at least locally deformed, balls of said first raceway pairs are released radially inward by a greater amount than the amount resulting from the radial migration of said balls of said second raceway pairs, and said joint parts disengage during which disengagement said inner hub and/or said outer hub is just plastically or elastically deformed and not destroyed.

3. The drive joint according to claim 2, wherein the outer hub is configured as a deformation element.

4. The drive joint according to claim 2, wherein the outer hub is configured in such a manner that if a predetermined axial force on the drive shaft is exceeded, it allows disengagement of the inner hub from the outer hub, with plastic and/or elastic deformation.

5. The drive joint according to claim 2, wherein several raceways assigned to one another are provided in the inner hub and the outer hub, in which balls are accommodated to transfer torque, and wherein a series of raceways of the inner hub runs at a slant to the axis of the inner hub, and is configured in such a manner that the raceways of the inner hub can be plastically and/or elastically deformed when the inner hub and the outer hub disengage, by means of the balls, at least at their drive-side end.

6. The drive joint according to claim 2, wherein the inner hub has an inner insertion gearing oriented coaxially to the axis of the inner hub, for accommodating an outer insertion gearing of one of the shaft sub-sections.

7. The drive joint according to claim 2, wherein the inner hub has a ring groove on its drive-side end, as an assembly aid.

8. The drive joint according to claim 2, wherein the joint has a weld flange for attachment to at least one of the shaft sub-sections on its drive-side and/or power-take-off-side end.

9. The drive joint according to claim 8, wherein the outer hub has a carrier housing having an accommodation region for the outer hub assigned to it, and that a lid is wedged in between the accommodation region for the outer hub and the weld flange, on the inside of the carrier housing.

10. Drive joint according to claim 2, wherein the first shaft sub-section comprises a drive-side end and the second shaft sub-section comprises a power-take-off-side end,
wherein the torque transfer mechanism comprises a ring-shaped cage having a spherical outer surface, which is disposed between the inner hub and the outer hub, and has radial windows, in accordance with the number of running groove pairs, in which balls that engage in the running grooves are guided, and whereby the cage is guided to be centered in the outer hub, the drive having first introduction contours provided in the inner surface of the outer hub, which are disposed on both sides of the first outer running grooves and make a transition, from the drive-side end, at a diameter that at least approximately corresponds to the outside diameter of the cage, at least approximately after half the axial length of the outer hub, into first cage centering surfaces that run at an incline in the direction of the cage axis, and are configured to be ball-shaped, in accordance with the spherically shaped contact surfaces of the cage, second introduction contours provided in the inner surface of the outer hub, which are disposed on both sides of the second outer running grooves and make a transition, from the power-take-off-side end, at a diameter that at least approximately corresponds to the outside diameter of the cage, at least approximately after half the axial length of the outer hub, into second cage centering surfaces that run at an incline in the direction of the cage axis, and are configured to be ball-shaped, in accordance with the spherically shaped contact surfaces of the cage, whereby centering of the cage takes place exclusively in the outer hub, and centering of the inner hub relative to the outer hub takes place exclusively by way of the balls.

11. The drive joint according to claim 2, wherein at least the contour of the second inner running grooves, and/or the contour of the first cage centering surfaces of the outer hub, and/or the contour of the spherical outer surface of the cage, and/or the elasticity of the outer hub, are coordinated with one another in such a way that radial widening is made possible at least in the region of the second outer running grooves, by way of the balls of the second row that are displaced radially outward.

12. Drive joint according to claim 2,
wherein said drive joint comprises a ring-shaped cage which is disposed between said inner hub and said outer hub;
said ring-shaped cage having radial windows, in accordance with the number of said raceway pairs, in which said balls are guided, wherein said outer contour of said inner hub and said inner contour of said outer hub at least in the disengagement direction is shaped in such a manner and is provided with such a strength that said ring-shaped cage is held firmly relative to said outer hub during disengagement, and that said inner hub and/or said outer hub is just plastically or elastically deformed and not destroyed even when said inner hub disengages.

* * * * *